Figure 1:
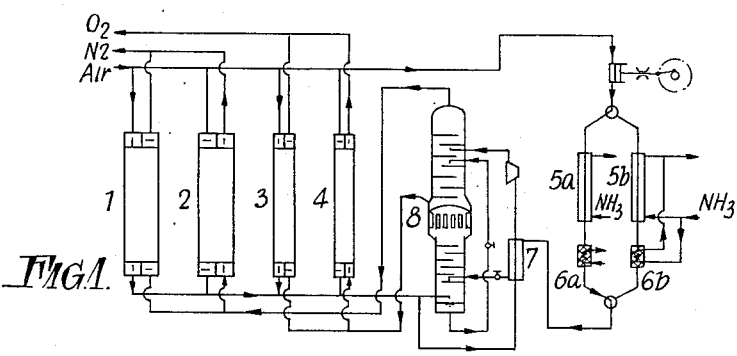

May 20, 1958     E. KARWAT     2,835,115

PROCESS FOR SEPARATING A COMPRESSED GAS MIXTURE

Filed May 20, 1955

United States Patent Office 2,835,115
Patented May 20, 1958

2,835,115

PROCESS FOR SEPARATING A COMPRESSED GAS MIXTURE

Ernst Karwat, Pullach, near Munich, Germany, assignor to Gesellschaft für Linde's Eismaschinen Aktiengesellschaft, Munich, Germany Application May 20, 1955, Serial No. 509,730

Public Law 619, August 23, 1954
Patent expires November 10, 1969

7 Claims. (Cl. 62—175.5)

In the separation of gas mixtures, the actual separation is usually preceded by purification and cooling steps. In cold accumulators which are adapted to be changed over, or in counter-current apparatus of interchangeable cross-section, the steps of cooling and purification are simultaneously carried out. However the re-vaporisation of the separated condensates at the cold end of the heat exchanger is impeded if equal quantities of hot, unseparated gas mixtures and cold separation products are fed to the exchanger. The reason for this is that the compressed gas mixtures, especially at low temperatures, have a substantially greater specific heat than the uncompressed products of separation. Consequently, the temperature difference between the products of equal weight entering and leaving the exchanger is substantially greater at the cold end than at the other parts of the exchanger, so that the re-vaporization of separated condensates is impeded even if the ratio between the volumes of the gases entering and leaving, is such that revaporization takes place at medium or high temperatures. In the art of gas separation, this is remedied in various ways, for example by not introducing part of the gas mixture to be separated through the cold accumulators, and by discharging the separation products through the accumulators. One example of the latter method is provided by the high-pressure air separation by the Linde-Frankl process. The air is not introduced through the cold accumulators, but one part of its products of separation passes out through the regenerators. Another known method resides in feeding the whole of the gas mixture to be separated to the heat-exchangers, branching off an incompletely purified, cooled part before it reaches the coldest zone and completely cooling and purifiying this part in counter-current heat-exchange with the cold gas mixture. The refrigerated impurities are deposited in the counter-current apparatus and the apparatus is freed from the deposits by heating. Meanwhile, a second counter-current apparatus cools and purifies the branched-off gas current. These counter-current apparatuses are large and costly and frequent changing thereof is necessary. Furthermore, the temperature of the gas current cooled therein fluctuates like that of the component current, to the detriment of the further use of the apparatus.

It is an object of the present invention to provide a new and improved way of solving the problem referred to above.

According to the invention there is provided a process for separating gas mixtures comprising the steps of dividing the gas mixture into two parts, cooling and partially purifying one part in cold accumulators, contacting the other part with an adsorption medium to purify the latter part, separating both parts and re-heating their separation products in the cold accumulators.

The result of this process is that a quantity of gas is heated in the cold accumulators or counter-current apparatus which is larger than the quantity which is cooled to the extent of the partial stream branched off. This leads to equilibrium of the cold economy and ensures re-vaporisation of condensates which are separated off.

The partial stream can be branched off from the main stream of the gas mixture to be separated both before the cold accumulator and after passing through a part thereof, that is, after the main gas stream has been freed from part of its impurities by cooling and condensation, whereafter the remaining impurities are removed from the main stream in the further part of the cold accumulator through which the main stream passes, and by absorption from the branch stream.

If the main current is divided before entering the regenerator, more gas flows back through the regenerator over its entire length than flows into it. The consequence is, as shown by a heat balance, that the temperature difference between the gases entering and leaving becomes smaller at the cold end and greater at the warm end of the regenerator. The re-vaporisation of the separated condensates at the cold end is accordingly facilitated. On the other hand, the greater temperature difference at the warm end constitutes a cold loss. In order to compensate for this loss with a small expenditure of energy, heat is withdrawn by means of a refrigerating machine, e. g. an ammonia refrigerating machine from the component current branched off from the main stream, before the latter component current is fed to the separation apparatus. It is advantageous to carry out the adsorption of the carbon dioxide at the temperature and with the assistance of this refrigerating machine.

Figure 2:
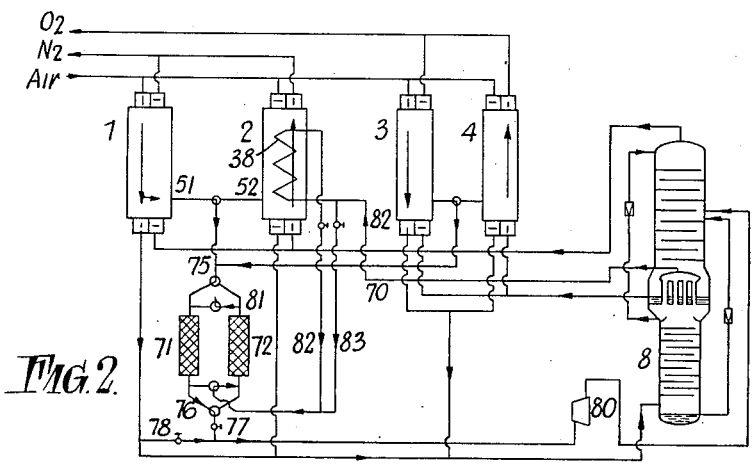
Figure 3:
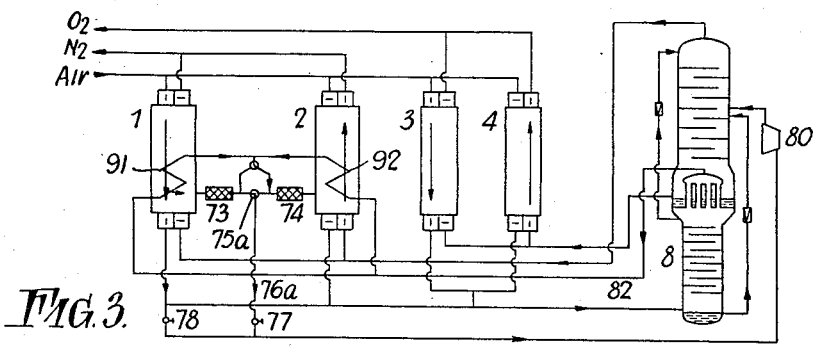

For a better understanding of the invention and to show how the same way may be carried into effect, reference will now be made to the accompanying drawings in which:

Figure 1 shows diagrammatically one constructional form of an air-separation installation, and Figures 2 and 3 are diagrammatic representations of other constructional forms of an air separation installation similar to that of Figure 1. Referring to Figure 1, this installation comprises four cold accumulators 1 to 4 for the heat-exchange of compressed air, which enters through the cold accumulators 1 and 3, whilst its products of separation, that is, nitrogen and oxygen, which flow through the accumulators 2 and 4. Before the compressed air enters the cold accumulator, a part (approximately 2%) is branched off, compressed to about 15 atmospheres super-atmospheric pressure, dried at a temperature of —45° in ammonia pre-coolers 5a and 5b, freed from carbon dioxide in adsorbers 6a and 6b filled with silica gel, liquefied in a counter-current apparatus 7 and fed to the pressure rectification stage of a double column rectifier 8. The main air current coming from the regenerators is separated in the rectifier 8 in a manner known per se as shown in the figure. The products of separation, namely oxygen and nitrogen, are slightly heated in the regenerators 2, 4. A quantity of products of separation is discharged through the cold accumulators in this operation which is 2% greater than the quantity of air introduced. The ammonia refrigerating machine compensates for the cold loss occurring at the warm end of the regenerators. The adsorbers 6a and 6b are run alternately hot and cold in the same way as the ammonia pre-coolers 5a and 5b and are desorbed in the respective hot periods.

Referring now to Figure 2, only the cold accumulators 1 for the entering air and 2 for the discharged nitrogen are shown, in order to describe the principle of the process step which is selected. The corresponding accumulators 3 and 4 for air and oxygen operate in practically the same manner as the accumulators 1 and 2.

A hot unpurified partial stream of air is withdrawn at the branch point 51 of the accumulator 1, through a change-over member and fed together with a corresponding partial air stream coming from the accumulator 3 at 70, through a change-over member 75 to an adsorber 71. The air is purified from carbon dioxide (and also from acetylene) in the adsorber 71 and passes through a change-over member 76 and a regulating valve 77 together with cold air controllably admixed at 78 to an expansion turbine 80 and from there to the air separator 8. The quantity of adsorption medium is chosen to be sufficient for the purification of the component current over a large number of change-over periods of the cold accumulators, for example over a week. The mass of adsorption medium is thus so great that the fluctuations in the temperature of the component current withdrawn at 51, which amount to 50° at a maximum during one period of the cold accumulator, are substantially compensated for. This is advantageous with regard to the uniformity of the cold production and the rectification in the upper column. A second adsorber 72 is in the desorption stage during the operation of the first adsorber 71. For this purpose, a current of dry, hot nitrogen free from carbon dioxide is passed therethrough. This nitrogen is taken from the pressure column at 82 heated to desorption temperature in a tube 38 situated in the cold accumulator, and forced through the adsorber 72. It leaves the adsorber with a carbon dioxide content at 81. Before the plant is set in operation, the adsorber 72 is cooled to the temperature at which the adsorber 71 operates by means of cold nitrogen coming indirectly from the pressure column at 83. The nitrogen leaving the accumulator 2 in the cold state in the second half of each discharge period is also available as a desorption medium. The cold required for the cooling of the adsorber can be provided without any appreciable disturbance of the general operation because the cooling can be extended over a long period, for example over a number of days.

Reference is now made to Figure 3. Again, for the sake of simplicity, only the cold accumulators 1 and 2 have been shown. Adsorbers 73 and 74 are used in this case with only a small quantity of gel, which is just sufficient to free from carbon dioxide the air current which passes during one working period of the accumulator through the said adsorbers i. e. through adsorber 73 and through the changeover member 75a by way of the pipe 76a to the turbine 80. At the same time, the gel in the accumulator 74 is traversed by a small quantity of dry nitrogen which is free from carbon dioxide. The nitrogen is supplied by preheating coils 91 and 92 and is preheated slightly above the temperature of the charge. This small quantity of nitrogen is chosen to be sufficient to remove the quantity of carbon dioxide adsorbed by the air in the preceding period. As soon as the accumulator 2 is operated with air, a component current passes therefrom through the adsorber 74 by way of the changeover member 75a to the pipe 76a, whilst the adsorber 73 is purified as already described. The adsorbers thus work in step with the cold accumulators. The advantage of this method of operation resides in the small expenditure of adsorption medium and the small amount of apparatus required.

The foregoing examples of the manner in which the invention is carried into effect are not to be regarded as an exhaustive description of the possible embodiments thereof. Counter-current heat exchangers in which the cross-sections traversed by the gas to be cooled and heated are interchanged at regular intervals of time for the purposes of re-vaporising deposited impurities are equivalent to the cold accumulators of the examples. The process according to the invention is also applicable to gas mixtures other than air and impurities of the gas maxture other than carbon dioxide and acetylene. The process according to the invention may also be applied to the purification of combustible gases by low cooling by means of cold accumulators. In order to separate the gas mixture, it is possible to employ, instead of the rectification mentioned in the examples, other methods, for example separation with washing agents, within the scope of the process of the invention.

I claim:

1. A process for purifying a compressed gas mixture comprising progressively cooling and purifying the compressed gas mixture, separating the processed gas mixture into first and second portions, continuing the cooling and purifying of the first portion to render the first portion colder than the second portion, purifying the second portion by adsorption, controllably mixing said portions to obtain a pure mixture at desired temperature, and using the mixture for a cold production process.

2. A process as claimed in claim 1 comprising adsorbing with a gel.

3. A process as claimed in claim 1 comprising subjecting the second portion to adsorption at the temperature at which said second portion is separated from the first portion.

4. A process as claimed in claim 2 comprising alternately and periodically processing two streams of compressed air and alternately and periodically subjecting portions of the streams to adsorption, and further alternately and periodically subjecting the gel to desorption at substantially the same temperature at which adsorption is performed.

5. A process as claimed in claim 2 comprising directionally switching the compressed air periodically in a purifying and cooling mechanism, and loading and desorbing the gel in accordance with the period of the switching.

6. A process as claimed in claim 1 wherein the gas is air.

7. A process as claimed in claim 1 comprising subjecting the second portion of gas mixture to adsorption with an adsorption material having a high mass to dampen temperature fluctuations and to enable long periods of operation without interruption.

References Cited in the file of this patent

UNITED STATES PATENTS

| 2,584,381 | Dodge | Feb. 5, 1952 |
| 2,617,275 | Goff et al. | Nov, 11, 1952 |
| 2,650,481 | Cooper | Sept. 1, 1953 |
| 2,699,047 | Karwat et al. | Jan. 11, 1955 |
| 2,777,299 | Skaperdas | Jan. 15, 1957 |

FOREIGN PATENTS

| 373,918 | Great Britain | June 2, 1932 |
| 497,662 | Belgium | Feb. 19, 1951 |

(Corresponding U. S. 2,699,047 Jan. 11, 1955)